(12) United States Patent
Woods et al.

(10) Patent No.: US 6,835,354 B2
(45) Date of Patent: Dec. 28, 2004

(54) INTEGRATED REACTOR

(75) Inventors: Richard Woods, Long Beach, CA (US); Kundaswamy Duraiswamy, Rancho Palos Verdes, CA (US); Shawn Barge, Costa Mesa, CA (US)

(73) Assignee: Hyradix, Inc., Des Plaines, IL (US)

( * ) Notice: Subject to any disclaimer, the term of this patent is extended or adjusted under 35 U.S.C. 154(b) by 770 days.

(21) Appl. No.: 09/732,230

(22) Filed: Dec. 7, 2000

(65) Prior Publication Data

US 2002/0071790 A1 Jun. 13, 2002

Related U.S. Application Data

(60) Provisional application No. 60/194,711, filed on Apr. 5, 2000.

(51) Int. Cl.[7] .................................................. B01J 8/18
(52) U.S. Cl. ...................................... 422/139; 422/168
(58) Field of Search ................................. 422/139, 168, 422/146, 177

(56) References Cited

U.S. PATENT DOCUMENTS

| | | | | |
|---|---|---|---|---|
| 3,690,840 A | * | 9/1972 | Volker | 422/171 |
| 3,976,507 A | * | 8/1976 | Bloomfield | 429/17 |
| 4,865,926 A | * | 9/1989 | Levy et al. | 429/20 |
| 5,207,185 A | * | 5/1993 | Greiner et al. | 123/3 |
| 5,645,951 A | * | 7/1997 | Johnssen | 429/16 |
| 6,299,994 B1 | * | 10/2001 | Towler et al. | 429/17 |
| 6,375,924 B1 | * | 4/2002 | Towler et al. | 423/656 |
| 6,387,555 B1 | * | 5/2002 | Wheeler et al. | 429/17 |
| 6,409,974 B1 | * | 6/2002 | Towler et al. | 422/172 |

* cited by examiner

*Primary Examiner*—M. Alexandra Elve
(74) *Attorney, Agent, or Firm*—Pauley Petersen & Erickson

(57) ABSTRACT

An integrated reactor for producing fuel gas for a fuel cell, the integrated reactor comprises an waste gas oxidizer (WGO) assembly having an associated WGO chamber, an inlet, an outlet and a flow path for exothermic gases produced in the WGO chamber. The integrated reactor has an autothermal reactor (ATR) assembly located within the WGO chamber. The ATR assembly has an inlet means and an outlet means for process gases flowing therethrough and a catalyst bed which is intermediate the inlet and outlet means. At least a part of the inlet means of the ATR assembly is located in the flow path of the WGO chamber to facilitate the transfer of thermal energy.

31 Claims, 11 Drawing Sheets

INTEGRATED REACTOR

CROSS REFERENCE TO RELATED APPLICATIONS

This application claims the benefit of U.S. Provisional application No. 60/194,711 filed Apr. 5, 2000.

FIELD OF THE INVENTION

This invention relates to fuel-gas generation systems for fuel cells and hydrogen generation equipment.

BACKGROUND OF THE INVENTION

Fuel cells are increasingly becoming an alternative way of producing electricity for use in commercial and industrial establishments, electric vehicles, and homes. However, their rapid assimilation into society is being hindered by the high costs and hazards associated with using pure hydrogen as a source of fuel in the fuel cell, and the complexity of small-scale fuel processors that are incorporated into the fuel cell system. Various methods of producing a hydrogen-rich air stream for use as fuel in a fuel cell, by using easily available hydrocarbon fuels such as natural gas or gasoline as a raw-product, are currently under development. The successful development of such systems to avoid current problems will greatly facilitate the wider acceptance of fuel cells as a commercially viable source of energy.

Many existing fuel cell systems are, furthermore, currently not economically feasible due to the large number of components that go into their fabrication, which greatly add to the cost and complexity of maintaining such systems. These systems may also be very complicated to operate and maintain on an on-going basis. Because of their current arrangement, these systems are also relatively inefficient with respect to the quantity of fuel cell fuel-gas actually produced.

There is therefore a need for a fuel cell fuel-gas generation system which has fewer parts, is easier to fabricate and maintain, and which operates at a higher efficiency than currently available fuel cell fuel-gas generation systems.

SUMMARY OF THE INVENTION

In this specification, a "waste gas oxidizer" (WGO) means a device wherein unused hydrogen rich fuel-gas or unrecovered hydrogen is oxidized before being vented to the atmosphere or to other post-treatment devices. The unused hydrogen rich fuel-gas may be from the anode of a fuel cell, and the unrecovered hydrogen may be from, for example, a Thermal Swing Absorber (TSA) or Pressure Swing Absorber (PSA). The unused or unrecovered hydrogen is sometimes referred to as tail gas or waste gas. In a preferred embodiment, the WGO is an anode-off gas oxidizer (AGO).

The waste gas may consist mostly of hydrogen, carbon monoxide, carbon dioxide, light hydrocarbons (such as methane), and water vapor. Oxygen is preferably added to enable the hydrogen, carbon monoxide, and hydrocarbons to be oxidized to water and carbon dioxide. The required oxygen may be provided either in the form of air or unreacted cathode off gas, or a mixture thereof, from a fuel cell which contains enough oxygen for the oxidation reaction.

Typically, a WGO may comprise an enclosed volume with a first inlet for the hydrogen-rich anode off gas or tail gas, a second inlet for the oxygen containing cathode off gas, a means for igniting the combustible mixture of hydrogen rich anode off gas and the oxygen containing cathode off gas within the enclosed space, and an outlet for the products of combustion from the enclosed space. The reaction of the hydrogen, carbon monoxide, and hydrocarbons in the anode off gas with the oxygen in the cathode off gas takes place in the enclosed volume of the WGO and the unreacted products leave the enclosed volume through the product outlet.

The enclosed volume can be within a pressure vessel or a pipe or a tube, which may be constructed of steel, stainless steel, steel alloy or another suitable metal. It could also be non-metallic such as glass, composite insulation, ceramics etc. The two inlets and the outlet can be either formed integrally with the vessel or they can be separate components which are attached by welding, soldering, brazing etc. The enclosed volume is preferably large enough to provide the required residence for the oxidation reaction to take place to the required degree of completion. The ignition means can consist of any suitable means for initiating and maintaining an oxidation reaction such as a spark-igniter, a flame rod, a hot electric resistance wire, or a heated metallic or ceramic matrix.

The WGO can be started up and brought up to operating temperature using auxiliary hydrocarbon fuels such as methane, propane etc. After the WGO reaches the operating temperature, the anode off gas or the tail gas can be introduced into the reaction chamber for oxidation of the hydrogen, carbon monoxide and the hydrocarbons to carbon dioxide and water. The auxiliary fuel can then be turned off and the WGO operating temperature can be maintained by the oxidation of the hydrogen, carbon monoxide and hydrocarbons in the anode off gas or tail gas to carbon dioxide and water.

In this specification, an "autothermal reformer" (ATR) is a device for the conversion of a mixture of hydrocarbon, steam, and oxygen to a hydrogen-rich gas. The hydrogen rich gas may or may not also contain carbon monoxide as a byproduct. An ATR may or may not utilize catalysts for carrying out the above conversion. However, the use of catalysts in the ATR reduces the average operating temperature of the conversion reaction.

In an ATR, the primary reactions which facilitate the conversion of the hydrocarbon to a hydrogen rich gas are a partial oxidation reaction and steam methane reforming (SMR) reaction. If catalysts are used for the conversion, the partial oxidation reaction is generally referred to as a catalytic partial oxidation (CPO) reaction. The CPO reaction for the conversion of methane is:

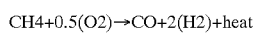

The CPO reaction is exothermic and therefore has the advantage of very fast response to a change in the hydrogen demand from the fuel cell. If a catalyst is not used, the operating temperature is higher.

The second reaction that takes place in an ATR is the SMR reaction which is described by the following chemical reaction:

This reaction is highly endothermic and may take place without a catalyst. However, a catalyst is typically used to enable the reaction to take place at a lower. The SMR reaction provides a higher quality of hydrogen in response to fuel cell hydrogen-load demand and improves the process efficiency. Heat energy for the endothermic SMR reaction is provided by direct heat transfer and heat from the partial oxidation of the hydrocarbon in the CPO reaction described above. Therefore, in an ATR, the exothermic CPO reaction is balanced by the endothermic heat of the SMR reaction.

The combination of the CPO and the SMR reactions in the ATR provides a gas stream with a higher concentration of hydrogen than that produced by the CPO reaction alone. However, this combination also provides a faster response to fuel cell hydrogen load demands than is possible with a SMR reaction alone.

While the ATR consists predominantly of the CPO and SMR reactions, some water gas shift (WGS) reactions may also occur within the ATR as described by the following chemical equation:

$$CO + H_2O \rightarrow CO_2 + H_2 + heat$$

The WGS reaction reacts some of the CO generated during the CPO reaction with some of the steam to produce additional hydrogen.

Separate catalysts can be used for the CPO reaction and the SMR reactions. Alternatively, a combined catalyst in which both reactions take place can also be used. According to one aspect of the invention, there is provided an integrated reactor for producing fuel gas for a fuel cell, the integrated reactor comprising: an waste gas oxidizer (WGO) assembly having an associated WGO chamber, an inlet, an outlet and a flow path for exothermic gases produced in the WGO chamber; and an autothermal reactor (ATR) assembly located at least partially in the WGO chamber, the ATR assembly having an inlet means and an outlet means for process gases flowing therethrough and a catalyst bed intermediate the inlet and outlet means, at least part of the inlet means of the ATR assembly being located in the flow path of the WGO chamber.

In one aspect, the present invention relates to an integrated reactor configuration for the production of a fuel cell fuel-gas. More particularly, the invention provides for the integration of an autothermal reformer (ATR) assembly into an waste gas oxidizer (WGO) assembly. One of the benefits of integrating an autothermal reformer assembly into the waste gas oxidizer assembly is to enhance thermal integration so that the higher temperature heat generated during the operation of the waste gas oxidizer assembly can be used to advantage. This higher temperature heat may be transferred into the steam reforming section of the ATR assembly, allowing for decreased air consumption within the partial oxidation section of the ATR assembly. The lower air consumption increases the overall process efficiency and enhances the system operating characteristics.

The configuration of the integrated reactor of the invention, comprising the autothermal reformer (ATR) assembly within the waste gas oxidizer (WGO) assembly, has important applications in fuel processing subsystems that operate at under-oxidized stoichiometric ratios (SR) between 0.00 and 0.30. It has been found that the practical thermal neutral point (TNP) with heat loss considerations is at stoichiometric ratios of approximately 0.20 to 0.25 SR. The thermal neutral point is the operation point at which no net heat is generated within the ATR.

The addition of oxidant to the reactant mixture generates the heat necessary to sustain the endothermic reforming reaction and compensate for heat losses. The thermal neutral point refers to the minimum amount of oxidant addition necessary to balance the endothermic reforming loads and the exothermic partial oxidation reaction.

One important application for the invention is its use in fuel cell systems. These applications require fuel-processing subsystems that simultaneously meet high efficiency characteristics, low equipment costs, and flexible operation.

The integrated reactor of the invention has certain distinct advantages when compared with state-of-the-art systems. One such advantage is that the innovative integrated configuration of the reactor allows for operation of the autothermal reformer assembly using lower amounts of oxidant or air. This, in turn, results in the attainment of higher efficiencies because less fuel is directly processed with oxygen (for example, net 3 moles $H_2$ per mole of $CH_4$), and more fuel is directly processed with steam (net 4 moles $H_2$ per mole of $CH_4$). Additionally, the waste heat from the anode off-gas combustion is used by direct heat transfer to supply heat to the endothermic reaction in the steam reformer. Another benefit of the invention is that the integrated reactor configuration facilitates the transfer of heat within the reactor such that high quality (high temperature) heat generated in the combustor of the WGO assembly is used to preheat the process gas entering the ATR to heat the process gases which are flowing through the steam reforming section of the ATR assembly.

It will be noted that, although existing autothermal reformers for fuel processing may use the waste gas oxidizer reactor to generate steam, there is no direct thermal integration between the heat produced by the waste gas oxidizer with the process gas entering and flowing through the autothermal reactor. The process gases in conventional autothermal reactor systems are typically pre-heated only by heat exchange with the exiting product gas from the autothermal reformer itself, but receive no heat directly from the waste gas oxidizer. In conventional systems, moreover, steam generated by the waste gas oxidizer, or fuel/steam mixtures pre-heated by the waste gas oxidizer, occur separately and discretely, and are thereafter sent to the autothermal reformer. It will also be noted that, although existing steam methane reformers for fuel processing may use the waste gas oxidation reaction to directly heat the SMR catalyst, these reactors do not use CPO catalysts to provide the additional benefits of the ATR process.

Since the ATR assembly is integrated within the WGO assembly, more difficult fuels to reform, such as gasoline and diesel fuels, may be easily handled. In addition, the added flexibility of ATR introduces the ability to control the thermal environment of the reforming process in two ways. First, this environment can be controlled directly by increasing or decreasing the amount of air added to the process gases entering the ATR section and, second, the environment can also be controlled by increasing or decreasing the combustion intensity within the combustion section. The integrated ATR/WGO assembly may be connected to a plate type heat exchanger that functions to preheat the reformer process gases by heat exchange with the ATR section product gases as they exit the ATR section and prior to entering downstream reactors. Another unique characteristic of this embodiment is that the ATR process gases and the WGO combustion gases flow essentially in a counterflow configuration.

In one embodiment of the invention, the integrated autothermal reactor includes an external jacket in which process gases in the ATR assembly are pre-heated prior to entering the catalytic beds of the ATR assembly reactor zones. In a preferred embodiment, this ATR assembly is fully integrated with the primary WGO assembly such that heat generated by the WGO assembly combustion process is in contact with the external jacket of the ATR assembly. This may be considered as the pre-heating jacket in which the process gases, such as steam, fuel and oxidant, are heated. This heat can be used to increase temperature and to vaporize liquid fuels and/or water. In addition, embodiments of the invention provide an ATR reactor assembly within the WGO assembly whereby a primary steam generation jacket is also provided such that the thermal output from the WGO assembly is used to heat the primary steam used in the ATR assembly. In such an embodiment, therefore, heat generated by the WGO assembly first preheats both the process gases entering the ATR assembly as well as later vaporizing the water/steam which is a component of the process gases.

In yet a further embodiment, the autothermal reformer assembly may include one or a series of heat transfer elements, which may be appropriately located between the WGO and the SMR reactor zones, for example, between the catalytic chambers in a monolith catalyst container, and these heat transfer elements facilitate heat conduction directly into the process gases flowing within the SMR section of the autothermal reformer assembly. The heat transfer elements may comprise metal or other highly conductive components, such as heat pipes, that are appropriately shaped and located within the integrated reactor, to maximize heat conduction.

The invention will be described with further reference to the attached drawings.

DETAILED DESCRIPTION OF THE PREFERRED EMBODIMENTS

Figure 1:
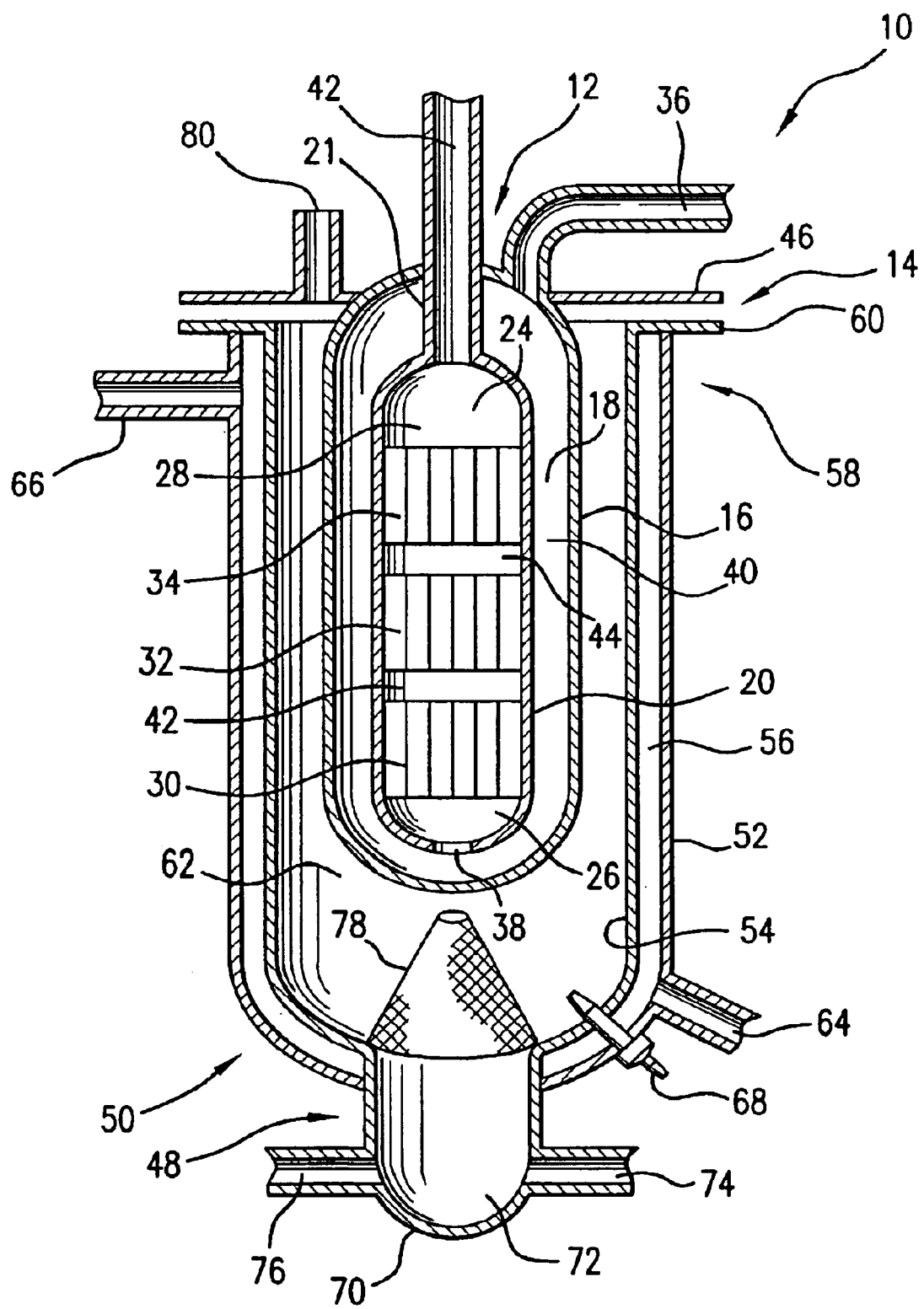
FIG. 1 is a diagrammatic cross-section through an integrated reactor of the invention showing an autothermal reformer assembly located within a waste gas oxidizer assembly.

Reference is now made to FIG. 1 of the drawings. FIG. 1 shows a preferred embodiment of the invention, showing in cross-section the configuration of an integrated reactor 10 comprised of essentially two components, namely, an autothermal reformer assembly (ATR) 12, contained within an waste gas oxidizer (WGO) assembly 14. It will be noted that the ATR assembly 12 is generally located by insertion within the WGO 14 in a manner so as to benefit from the thermal output produced by the WGO assembly 14, to be discussed in further detail below.

The ATR assembly 12 comprises an external heat exchange wall 16 defining a chamber 18 in which is located the shell 20 of the ATR assembly 12. The shell 20 has an upper end 24 and a lower end 26. In normal circumstances, and as will be described below, process gases flow upwardly within the shell 20 from the lower end 26 to the upper end 24. Within the shell 20, there is located a series of catalysts through which process gases must pass as they move through the chamber 28 defined by the shell 20 of the ATR assembly 12.

In the embodiment shown in FIG. 1, three catalysts are provided. The lowermost is a partial oxidation catalyst 30, and two steam methane reform catalysts 32 and 34 are located serially above the partial oxidation catalyst 30.

The chamber 18 defined by the heat exchange wall 16 includes an inlet 36 through which process gases are introduced into the chamber 18. These process gases may comprise a mixture of steam, fuel and oxidant or air. At the base of the shell 20 there is provided an opening 38 for the process gases, and through which these process gases can flow into the chamber 28 defined by the shell 20. Between the inlet 36 and opening 38, the heat exchange wall 16 and the shell 20 together define a flow space 40, which comprises the annular space between these two walls, for process gas flow.

At the upper end of the shell 20, there is provided a connection pipe 42, which may be in contact with a shift reactor and carbon monoxide polishing unit, and through which the process gases exit the ATR assembly 12 to be used and processed according to the needs and requirements of the system. As the gases exit catalyst 34, they contact heat exchanger wall 21 and can transfer heat to inlet gases from inlet 36 prior to entering flow space 40.

It will be noted that the partial oxidation catalyst 30, as well as both of the steam methane reform catalysts 32 and 34, are located serially one above the other within the chamber 28, in such a manner that the process gases are forced to pass therethrough. The catalysts 30, 32 and 34 are arranged in monolith form, with catalyst 30 and 32 being separated by space 42, and catalysts 32 and 34 being separated by space 44.

The ATR assembly 12 is attached to a lid 46 of the WGO assembly 14 in conventional manner so as to be inserted and suspended within the WGO 14 assembly as will be described.

The WGO assembly 14 comprises an waste gas combustor 48 supported at the lower end 50 of the WGO assembly 14. The WGO assembly 14 comprises an outer steam generation shell 52, and an inner steam generation heat exchange wall 54. The shell 52 and heat exchange wall 54 define therebetween annular space 56 in which water and steam and/or process gases are heated by thermal energy produced by the waste gas combustor 48, to be described.

The WGO assembly 14 has an upper end 58, terminating in a rim or flange 60. The annular space 56 is sealed at the upper end 58, and the rim or flange 60 engages the lid 46, so that the heat exchange wall 54, and the lid 46, define a sealed chamber 62.

The annular space 56 is supplied with a water connection 64 near the lower end 50 of the WGO assembly 14 through which water, or steam, supplied from a source (not shown)

can be introduced into the annular space 56. A steam exit connector 66 is provided near the upper end 58 of the WGO assembly 14, thereby providing a passage for steam produced by the heated water to pass through the annular space 56 in a direction extending from the water connection 64 to the steam exit connection 66. The process gases can also flow in the reverse direction entering at connection 66 and exiting at connection 64.

A spark plug or glow plug 68 is provided, and extends through the shell 52 and heat exchange wall 54 so as to pass from the exterior of the WGO assembly 14 into the sealed chamber 62. The function of spark plug 68 is to initiate the oxidation of the anode off-gas or superheated fuel in the WGO assembly 14. While the spark plug 68 in FIG. 1 is shown located in the shell 52, it could also be located in the wall of, and be a part of the waste combustor 48.

The waste gas combustor 48 comprises a wall 70 which defines a combustor mix chamber 72. Waste gas from a fuel cell enters the combustor mix chamber 72 through connection 74, while cathode-off gas enters the combustor mix chamber 72 through the connection 76. The waste gas combustor 48 includes surface combustor 78 which is mounted on the wall 70. As will be seen in FIG. 1, the wall 70, and combustor mix chamber 72 defined thereby, are essentially located outside of the chamber 62, while the surface combustor 78 portion of the waste gas combustor 48 is located within the chamber 62. Connections 74 and 76 can also be integrated into a tube-in-tube configuration to enhance mixing and control flash back.

As will be fully described below with respect to the operation of the integrated reactor 10 of the invention, fuel cell electrode off-gases are introduced into the chamber 62 of the WGO assembly 14 through the surface combustor 78, and flow through the chamber upwardly, eventually being discharged through exit connection 80 which can be formed in the lid 46 of the WGO assembly 14.

In the operation of the integrated reactor 10 shown in FIG. 1 of the drawings, process gases are coursed through the autothermal reactor assembly 12, while, at the same time, gases are combusted and produced within the waste gas combustor, and the thermal energy produced thereby interfaces with the process gases in the ATR assembly 12, providing thermal energy thereto, enhancing its efficiency and output.

In one aspect of the operation, process gases consisting of steam, fuel and oxidant are introduced through the inlet 36 and pass into the chamber 18 of the ATR assembly 12. These process gases move downwardly through the chamber, and eventually reach opening 38, thereafter being forced into the chamber 28. The process gases move upwardly from the lower end of the chamber 28 to the upper end 24 thereof, at the same time passing through the partial oxidation catalyst 30, space 42, the first steam methane reforming catalyst 32, space 44 and then through the second steam methane reform catalyst 34.

The process gases, upon reaching the upper end 24, of the chamber 18 exit through the connection pipe 42, for further processing. In one embodiment of the invention, as will be described with reference to FIGS. 2 and 3 of the invention, these treated process gases are conveyed to a shift reactor and CO polishing unit.

Within the partial oxidation catalyst 30, the fuel and oxidant portion of the processed gases react to form hydrogen and carbon monoxide, with the concomitant production of heat. However, some of the incoming fuel comprising process gases does not react, and flows through the partial oxidation catalyst 30, and thereafter into the two sequentially arranged steam methane reformer catalysts 32 and 34. In these steam methane reformer catalysts 32 and 34, the previously unreacted fuel reacts with the steam to form hydrogen and carbon dioxide. These reacted process gases are the ones entering the upper end of the chamber 28, and which are transmitted through the connection pipe 42 to the shift reactor or other apparatus as desired.

During the course of the passage of the process gases through the ATR assembly 12, the reaction of these process gases is facilitated and enhanced by thermal energy produced in the WGO assembly 14, in which the ATR assembly 12 is located. The production of this thermal energy, and the utilization thereof within the integrated reactor, commences with the mixing in the combustor mix chamber 72 of waste gas from a fuel cell, which enters through connection 74, and cathode-off gas or air, which enters the chamber 72 through connector 76. Within the mix chamber 72, these two components form combustion gases which then flow upwardly and through the surface combustor 78. Upon exiting the surface combustor 78 the mixed combustion gases pass into the chamber 62, and are ignited by the spark plug 68. The combustion, of course, produces heat, and the thermal energy thereof imparted to the surface combustor 78 radiates to the steam generation heat exchanger wall 54 as well as to the external heat exchanger wall 16 which forms a jacket about the ATR assembly 12. This heat is conducted by and transferred through the heat exchange wall 16, which facilitates pre-heating of the mixed process gases which are flowing through flow space 40 of the ATR assembly 12, as described above. Thus, between the process gas inlet 36 and the opening 38, the movement of the process gases through the flow space 40 results in the heating thereof, the heat being derived from the thermal energy produced by the combustion reaction in the chamber 62. The preheating of the process gases facilitates and enhances the reaction of the gases as they pass through the catalyst monolith located in the chamber 28 defined by the shell 20, and also reduces the air needed for the partial oxidation reaction of the feed, thereby reducing the SR (stoichiometric ratio) and associated nitrogen dilution.

In addition, the combustion of the gases in the vicinity of the surface combustor 78 also results in the production of heat which is transferred to and radiates through the heat exchange wall 16, thereby providing heat to the annular flow spaces 40 and 38. As has been described, the annular spaces 40 and 38 have process gases flowing therethrough, the gases being introduced through the connection 36, and exiting through the exit connector 42. Further, the steam generated from the water in the annular space 56 results from the thermal energy being transferred and conducted through the heat exchange wall 54.

The combustion gases from the surface combustor 78 travel through the chamber 62 upwardly toward the lid 46 of the WGO assembly 14, exiting the system through the exit connection 80. As will be described further below, the gases exiting through connection 80 may simply be exhausted, or may be used to provide heat for downstream combustion, or the pre-heating of one or more of the process fuels.

Figure 4:
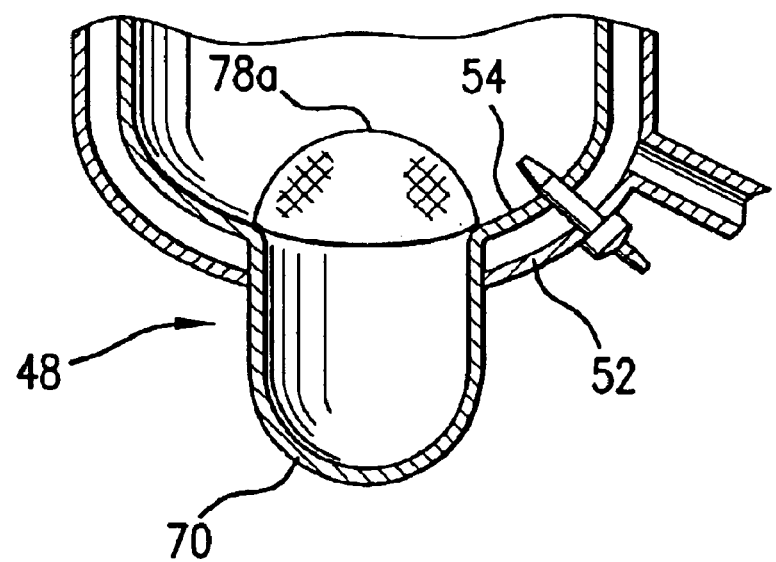
FIG. 4 is a detailed cross-sectional view through a waste gas combustor showing a different embodiment of the invention.
Figure 5:
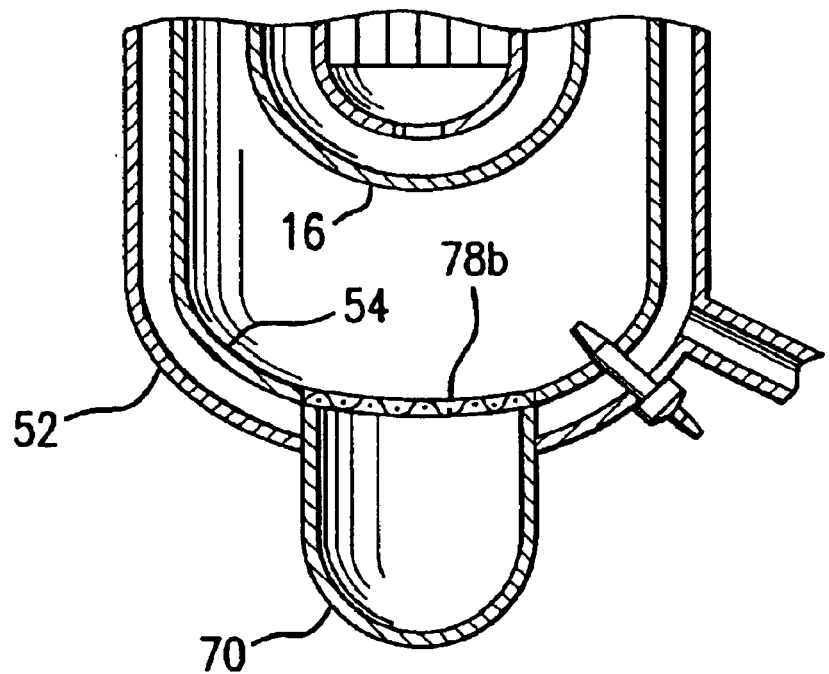
FIG. 5 is a detailed cross-sectional view through an waste gas combustor in yet a further different embodiment of the invention.

In FIG. 1 of the drawings, the surface combustor 78 is generally of frusto-conical shape, having a mesh surface through which the combustion gases can pass. FIG. 4 of the drawings shows an alternative variation in the shape of this surface combustor 78a, which has a more rounded, oval or elliptical shape. It will be appreciated that many different variations and modifications of this shape may be used, so that, in the operation of the context of the specific apparatus, maximum production and utilization of the thermal energy produced by the combustion gases in the waste gas combustor 48 is possible. For example, in FIG. 5, the lower end of the shell 16 is in close proximity to a concave-shaped surface 78b which forms the surface combustor.

Figure 2:
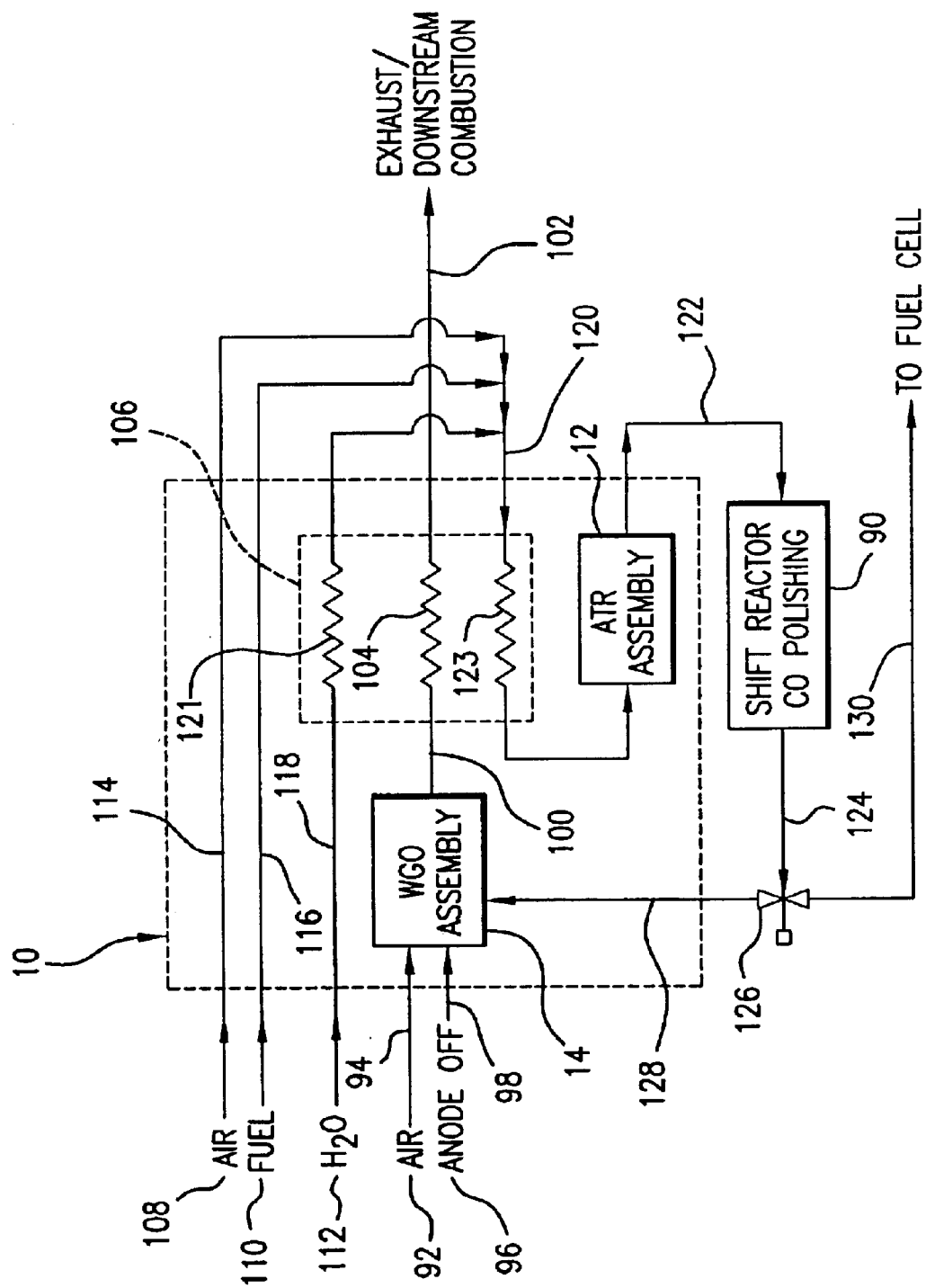
FIG. 2 is a diagram showing schematically the sequential operation of the embodiment of the invention shown in FIG. 1.

With reference to FIG. 2 of the drawings, there is shown schematically a flow diagram version of the integrated reactor system 10 of the invention. As will be seen in FIG. 2, the integrated reactor system 10 comprises an ATR reactor assembly 12 and an WGO assembly 14. Also shown is a shift reactor and carbon monoxide polishing unit 90 which is located downstream of the ATR assembly 12, for receiving the reacted process gases from the ATR assembly 12 for further use and processing.

In FIG. 2, air 92 flows through line 94, and waste gas 96 flows through line 98, to the WGO assembly 14. Upon combustion of the air and gases in the WGO assembly 14, the combustion gases and thermal energy produced by combustion move through line 100, and are eventually exhausted through exit 102. Alternatively, the exhaust gases and thermal energy may be further utilized to facilitate downstream combustion or provide additional thermal energy exchange in other portions of the system.

Within line 100, there is a heat exchanger 104 in which, as will be discussed below, the thermal energy within the combusted gases is conducted, radiated or otherwise transferred to other portions of the system for pre-heating and heating to facilitate hydrogen production within the integrated reactor. The heat exchanger cavity 104 is, in FIG. 2, schematically located within a heat transfer area 106, with the heat exchanger cavity 104 being in close proximity to other surfaces to impart the thermal energy.

In a parallel, but separate and independent system, air, fuel and water are transmitted through the ATR assembly 12. Air 108 is transmitted through line 114 to line 120. Fuel 110 is transmitted through line 116, also to line 120. Finally, water or steam 112 is transmitted through line 118 to line 120. Line 120 constitutes that part of the system at which the air 108, fuel 110 and water 112 are mixed, forming the mixed process gases which will be subsequently transmitted to the ATR assembly 12, and through the various catalysts therein. (In FIG. 2, the ATR assembly 12 is shown diagrammatically, and the catalysts therein are not specifically identified in the drawing).

In the embodiment shown in FIG. 2, the air 108 and fuel 110 are conveyed to line 120 without any pre-heating. However, it will be noted that the water 112, traveling through line 118, passes through the heat transfer area 106, and therein receives thermal input from the heat exchanger cavity 104. The line 118 incorporates heat exchanger 121 which is positioned to receive thermal energy from heat exchanger cavity 104, all in the heat transfer area 106. Thus, the water 112 in line 118 is heated so that the water, prior to mixing with the air and fuel in line 120, is either hot or converted to steam. Alternatively, in an embodiment not shown, line 120 where process gases are mixed can occur prior to heat exchange passage 121.

Line 120, containing the mixed air, fuel and water process gases, incorporates heat exchanger 123 as it passes through the heat transfer area 106, also receiving thermal input from heat energy in the heat exchanger cavity 104, produced by the WGO assembly 14. The heated process gases are then conveyed to the ATR assembly 12, and are treated as described above.

It will be noted that the pre-heating of the water 112 in line 118 corresponds generally with the heating of the water within the annular space 56 shown in FIG. 1 of the drawings. On the other hand, the heating of the process gases in line 120 shown in FIG. 2 would correspond to the heating of these gases as they flow generally through the flow space 40 shown in FIG. 1 of the drawings, and receive thermal input produced by combustion at the surface combustor 78, the heat of which is transferred through the heat exchange wall 16.

The process gases, upon reaction within the auto-thermal reactor assembly 12, exit the reactor through line 122. This line corresponds to the exit connection 80 shown in FIG. 1 of the drawings. These reacted process gases are moved, in the embodiment shown in FIG. 2, to a shift reactor and carbon monoxide polishing unit 90. The reacted gases or part thereof exit the shift reactor 90 through line 124, and are directed by a valve 126, according to the nature of the gases, either back to the WGO assembly 14 as product gas, along line 128, or are transmitted down line 130 to the fuel cell. Within the fuel cell, hydrogen is depleted to form an anode-off gas stream 96 which flows to WGO assembly 14 through line 98.

In FIG. 2, the line 94 may be used to introduce air or cathode-off gas, comprising depleted air from the fuel cell, and these are transmitted to the WGO assembly 14. The contents of lines 94 and line 98 enter the WGO assembly 14, and are ignited, thereby providing the hot combustion gases which thereafter flow through the line 100, and particularly through the heat exchanger cavity 104 which is the source of considerable thermal input for the water in line 118, and the process gas mixture in line 120, as already described.

Figure 3:
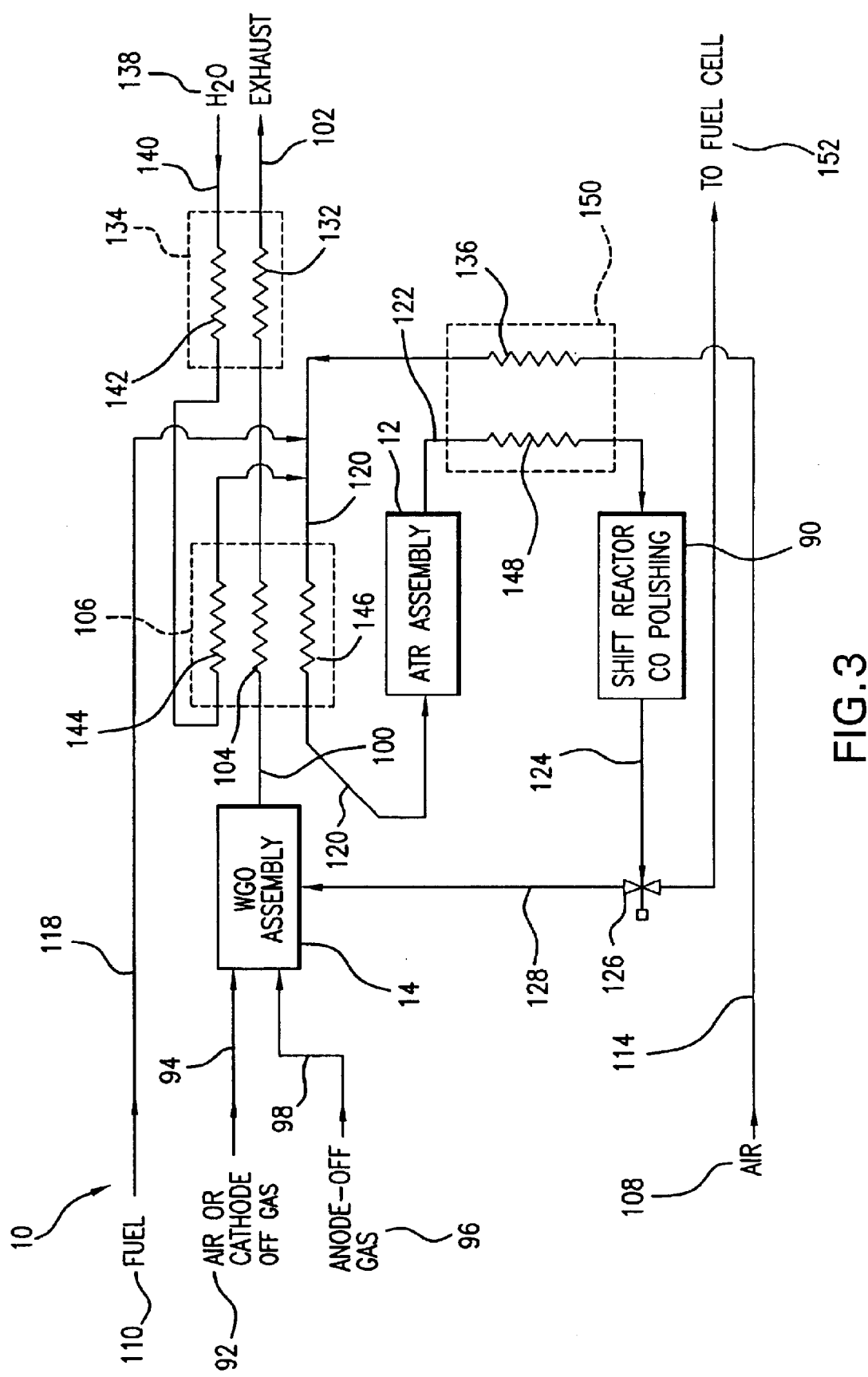
FIG. 3 is a diagram showing schematically the sequential operation of a further embodiment of the invention similar to that shown in FIG. 1.

Reference is now made to FIG. 3 of the drawings which shows a system using the integrated reactor 10 of the invention, but constitutes a more comprehensive system of thermal transfer so as to better utilize the heat energy produced by, and available within, the system. The integrated reactor 10 also comprises the autothermal reactor assembly 12, the waste gas oxidizer assembly of 14 and a shift reactor and carbon monoxide polishing unit 90. While the basic flow of combustion gases in the WGO assembly 14, and process gasses in the ATR assembly 12 remain essentially the same as that described with respect to FIG. 2 of the drawings, different and/or additional pathways are provided so as to maximize the use of thermal energy produced.

Air or cathode-off gas 92 is introduced to the WGO assembly 14 through line 94, and waste gas 96 is also introduced to the WGO assembly through line 98. The air or cathode-off gas, and the waste gas, are mixed in the WGO assembly 14 and combusted to produce substantial amounts of heat. The combustion gases and thermal energy pass through line 100 and eventually exit through the exhaust exit 102 at the end of the line. The line 100 incorporates heat exchanger cavity 104, located within a heat transfer area 106. Further, a heat exchanger 132 is located within line 100 prior to exit of the gases and their discharge through exit 102. The heat exchanger 132 provides thermal energy to incoming water, to be described further below. The heat exchanger 132 is located within heat transfer cavity 134.

The ATR reactor assembly 12 is located within the WGO assembly 14, in a manner the same as, or similar to, that illustrated in FIG. 1, and works essentially independently of the WGO assembly 14. In other words, the flow path of combustion gases in the WGO assembly 14 is separate compared to the flow path of the process gases in the ATR assembly 12. However, the two are integrated so that the ATR assembly 12 can maximize use of the thermal energy produced by the WGO assembly 14. In FIG. 3, fuel 110 is introduced to the ATR reactor assembly 12 initially through line 118. The line 118 ultimately transfers the fuel into the line 120. Air 108 moves through line 114, and is also ultimately discharged into the line 120, where it is mixed with the fuel flowing from line 118. The air line 114 incorporates heat exchanger 136 which receives thermal input and thus initial pre-heating, as described further below. A source of water 138 is introduced through line 140, and this water 138 is also ultimately transferred into the line 120 for mixing of the process gases. The line 140 incorporates a first heat exchanger 142 and a second heat exchanger 144, so that the water 138 moving through line 140 are pre-heated by receiving thermal input, to be described further below, as they pass through the first and second heat exchangers 142 and 144. The fuel source 110 can also be mixed with the water prior to heat exchangers 142 and 144.

The fuel 110 in line 118, the water source 138 in line 140, and heat in the first heat exchanger 142 and second heat exchanger 144, as well as the air 108 from line 114 come together and are mixed in line 120. The water source 138 is twice heated by thermal energy produced by the combustion in the WGO assembly 14. It is first heated at the first heat exchanger 142 by thermal input from the heat exchanger 132, and once again heated at its second heat exchanger 144 by thermal energy available at the heat exchanger cavity 104. Thus, the hydrocarbon water source 138 has undergone significant pre-heating at the two heat exchange transfer areas 106 and 134.

The mixed process gases introduced into line 120 also pass through the heat transfer area 106, at which point a heat exchanger 146 in line 120 receives thermal input from the heat exchanger cavity 104. After passing through the heat transfer area 106, the process gases are moved to the ATR reactor assembly 12 where they undergo reaction and processing, as has been described with respect to FIG. 1. The reacted gases exit the ATR reactor assembly 12 through line 122 and are moved to the shift reactor and carbon monoxide polishing unit 90. On route, the line 122 incorporates heat exchanger 148 which is proximal the heat exchanger 136 in the air line 114. Residual thermal energy in the process gases exiting the ATR reactor assembly 12 may be transferred within the heat transfer cavity 150 to the incoming air. Upon exiting the shift reactor and carbon monoxide polishing unit 90, the various gases are directed either to the WGO assembly 14 or a fuel cell 152 according to the setting of valve 126.

From the description above, it will be appreciated that the system described with respect to FIG. 3 of the drawings incorporates additional heat exchangers which, by more fully utilizing thermal energy produced in both the WGO assembly 14 and the ATR assembly 12, results in the more efficient use and disposition of the process gases. In other embodiments, the mix point 120 can be incorporated into air stream 114 prior to heat exchanger area 150.

Various embodiments and modifications can be used so as to facilitate and maximize heat transfer between the flue gas produced by combustion in the WGO assembly, on the one hand, and the process gases flowing through the ATR assembly 12. For example, metal monoliths may be used as catalyst carriers, since they have better thermal conductivity than ceramic monoliths which may normally be used, thereby allowing the heat energy to be dissipated more quickly and effectively to various portions of the monolith and catalyst to heat the process gases passing therethrough. As an alternative, ceramic or metal foams may be employed as catalyst carriers, as foams allow gases to transfer heat from the wall of the ATR assembly 12. As yet another alternative, a pelletized catalyst can be used which may simply be a variation of conventional steam methane reform catalysts (such as Ni—on alumina), or noble metal catalysts, such as Pt—Rh or Pt—Pd on suitable supports, may be utilized.

In yet a further embodiment, a surface combustor such as a metal fiber burner or a ceramic radiant burner may be employed in the waste gas oxidizer assembly, with inwardly radiating annular surfaces to facilitate better radiation and improved heat transfer abilities.

Figure 6:
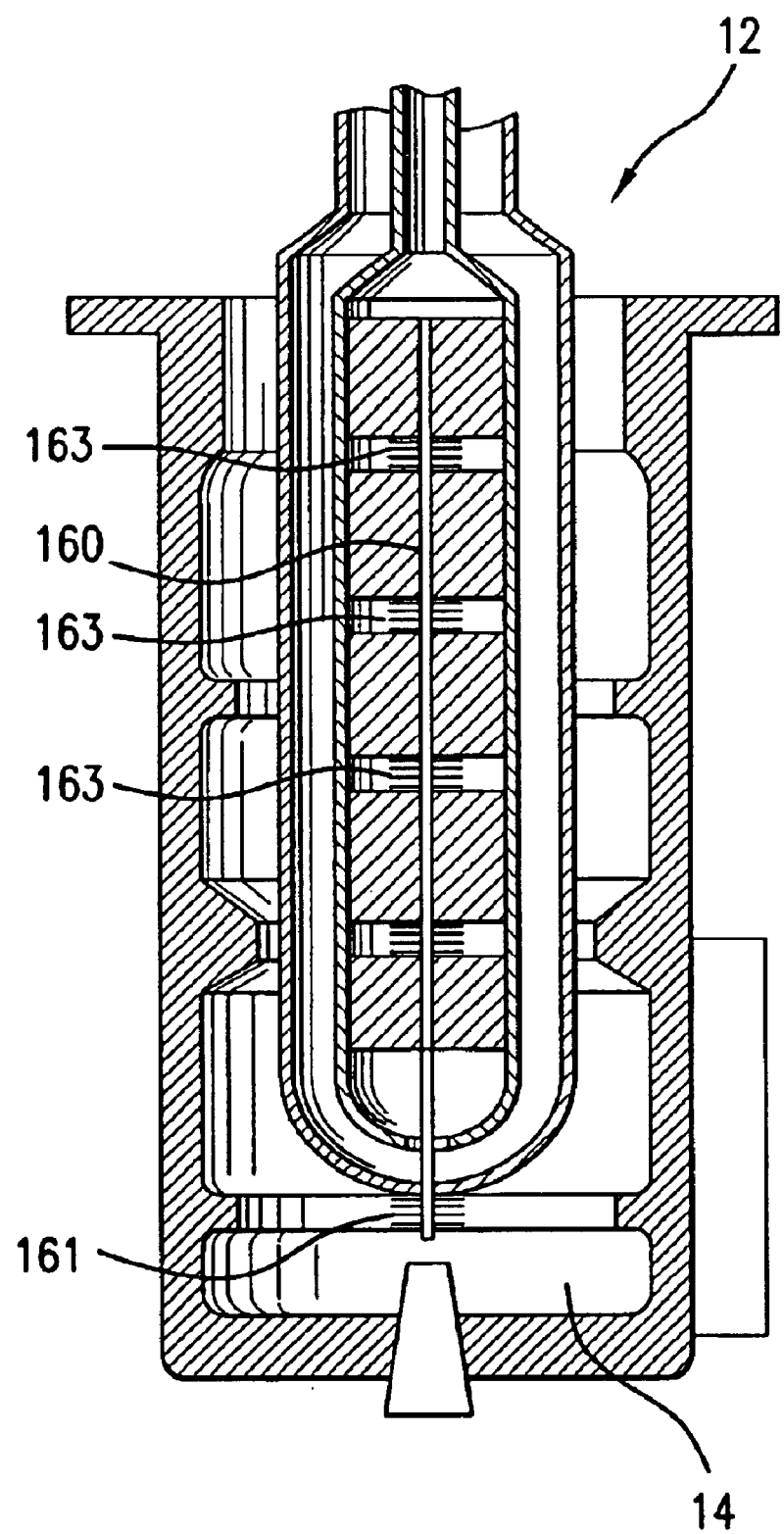
FIGS. 6 to 10 show different embodiments of the integrated reactor assembly, having alternative configurations with respect to heat transfer elements located therein.

FIGS. 6, 7, 8, 9 and 10 show variations with respect to the autothermal reformer assembly 12 which may be used, all of which may facilitate, in one way or another, improved thermal transfer for heating the process gases. For example, with reference to FIG. 6, it will be seen that heat pipes 160 or other transfer elements are used to facilitate transfer of heat from the flue gas produced by the combustion in the WGO assembly 14 to the heat collection region 161 of heat pipe 160 to the heat release regions 163 of heat pipe 160 to the process gas moving between the various catalytic stages in the catalyst monolith. In FIG. 6, the heat pipe 160 extends vertically and is axially aligned with the ATR assembly 12 through the various catalytic layers.

Figure 7:
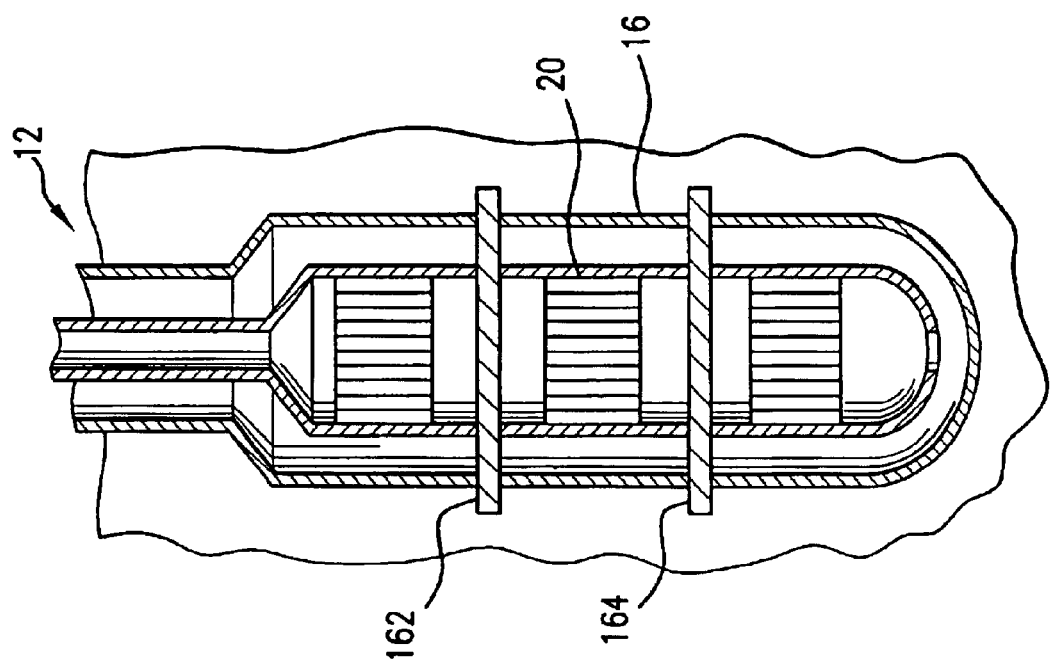

In FIG. 7, heat pipes or layers 162 and 164 are provided transverse to the axis of the process gas flow, and also extend through the shell 20 as well as the heat exchange wall 16 defining the autothermal reformer assembly 12. In this way, radiation and conductivity of heat through these heat pipes or layers 162 and 164 provide more opportunities for introducing the heat at various points and locations within the catalytic monolith.

Figure 8:
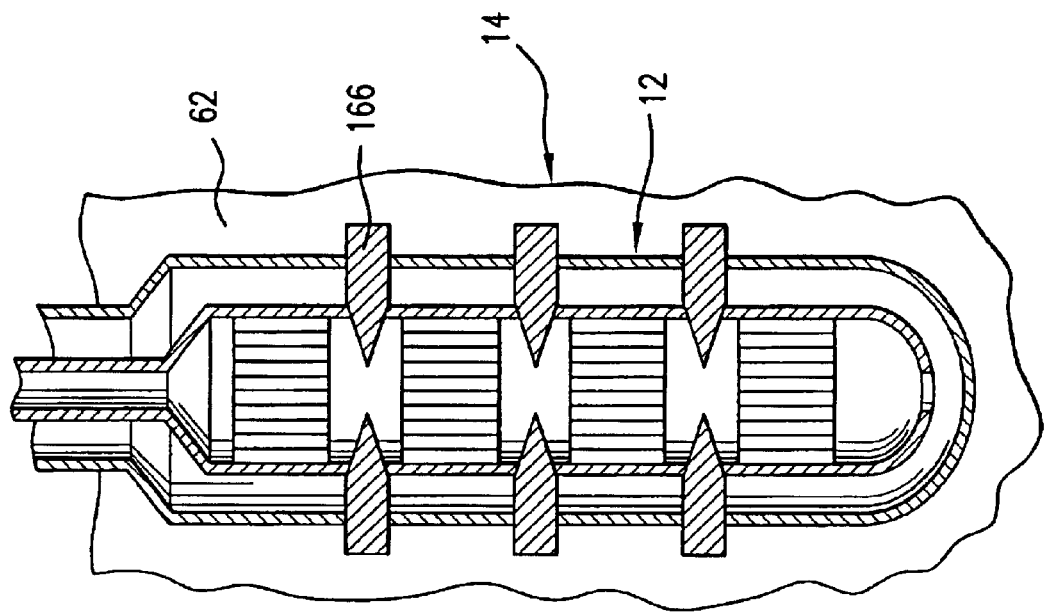

FIG. 8 shows yet another embodiment of conductive devices placed in the autothermal reformer assembly 12, and these comprise a series of wedge-shape conductors 166 which help transfer and dissipate the heat from within the chamber 62 of the WGO assembly 14 right into the heart of the catalytic layers within the ATR assembly 12.

Figure 9:
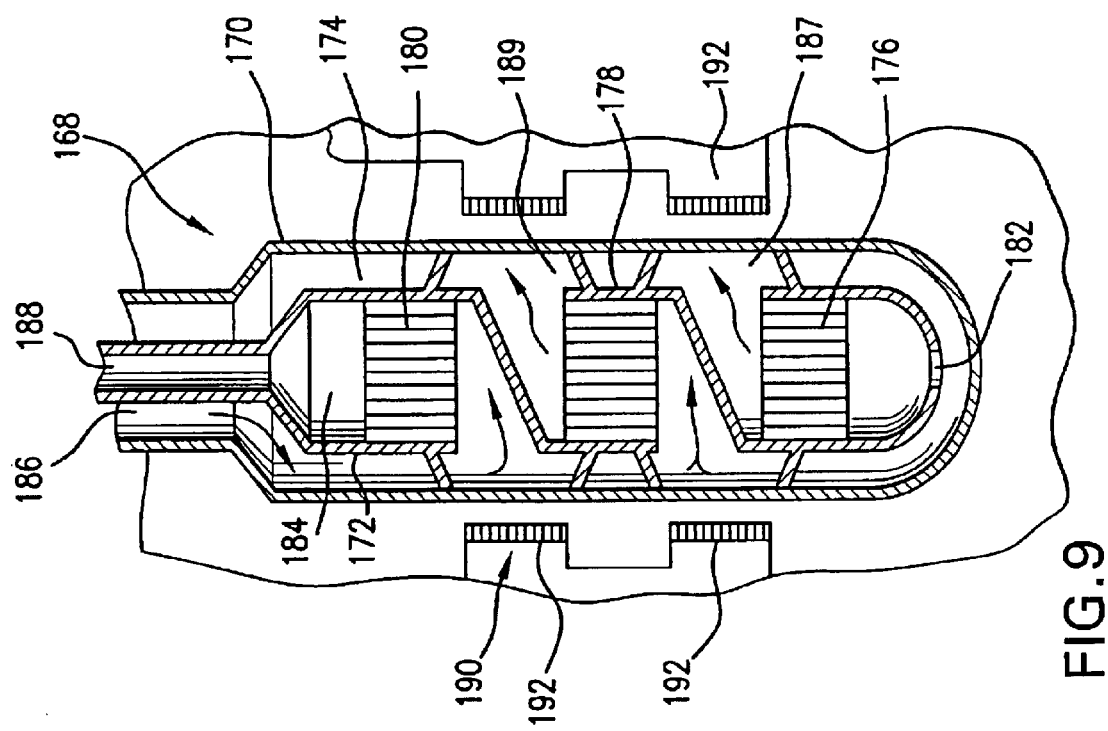

With reference to FIG. 9 of the drawings, there is shown yet another embodiment showing a different arrangement of the autothermal reactor assembly 12, the catalysts therein, and the flow path of the process gases through the catalyst. In FIG. 9, the ATR assembly 168 comprises an external jacket 170 and a shell 172 contained therein. The jacket 170 and shell 172 define an annular space 17 for the flow of process gases down to opening 182. This space 174 is continuous although not illustrated in the specific cross-section shown in FIG. 9. Three catalysts are serially arranged, catalysts 176, 178 and 180 each being spaced from one another. The shell 172 has an opening 182 through which process gases enter a chamber 184 in much the same way as has been described with respect to FIG. 1 of the drawings.

FIG. 9 illustrates the situation where the catalyst monoliths are positioned in such a way such that a spiral process gas path is created to maximize heat transfer from the WGO assembly 14 flue gas to these process gases.

The process gases enter the space 174 through top end 186, and travel down the space 174 in a spiral or helical fashion. At the base, they enter the opening 182, and pass through catalyst 176. Upon exiting the catalyst 176, the gases are moved spirally through space 187 so as to enter the catalyst 178. Upon exiting catalyst 178, the gases once again are transmitted spirally through the space 189 of the ATR assembly 12 until reaching catalyst 180. After passing through the catalyst 180, the process gases exit through connection pipe 188, and are processed in a similar manner as described above with respect to FIG. 1.

In FIG. 9, the WGO assembly 14 is partially shown, indicated by reference numeral 190. The WGO assembly 190 includes inwardly projecting fingers 192 which are configured so as to be located to maximize heating of the process gases passing between the catalyst section of the ATR assembly 168 at spaces 187 and 189. These fingers 192 are intended to heat the process gases as they spiral upwards, through the catalyst and the chamber 184.

Figure 10:
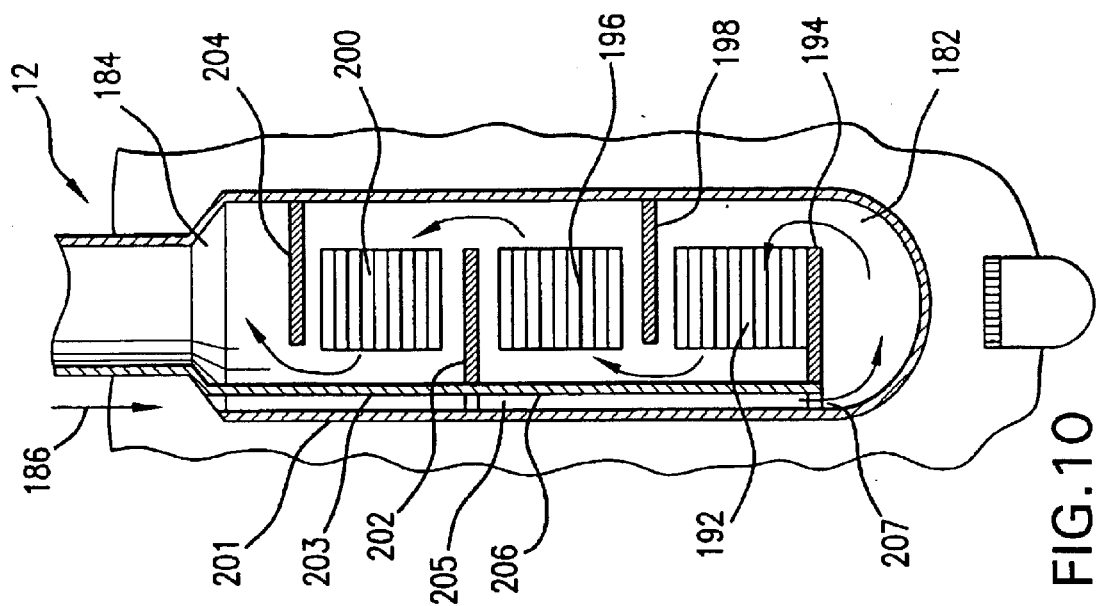

In FIG. 10 of the drawings, a further embodiment is shown which illustrates the positioning of the catalyst monolith in such as way as to have a zigzag process gas path. The lowermost catalyst 192 is located on metal support plate 194, while the intermediate catalyst 196 is located above metal support plate 198. Finally, the upper catalyst 200 is located above metal plate 202, and below metal plate 204. As illustrated by the arrows in FIG. 10, the process gases move zigzag through the ATR assembly 12. Process gases entering at 186 flow between wall sections 201 and 203 through cavity 205. These gases are preheated by heat from the WGO heat. The process gases exit cavity 205 through space 207 entering cavity 182 which is functionally similar to 182 of FIG. 9.

Figure 11:
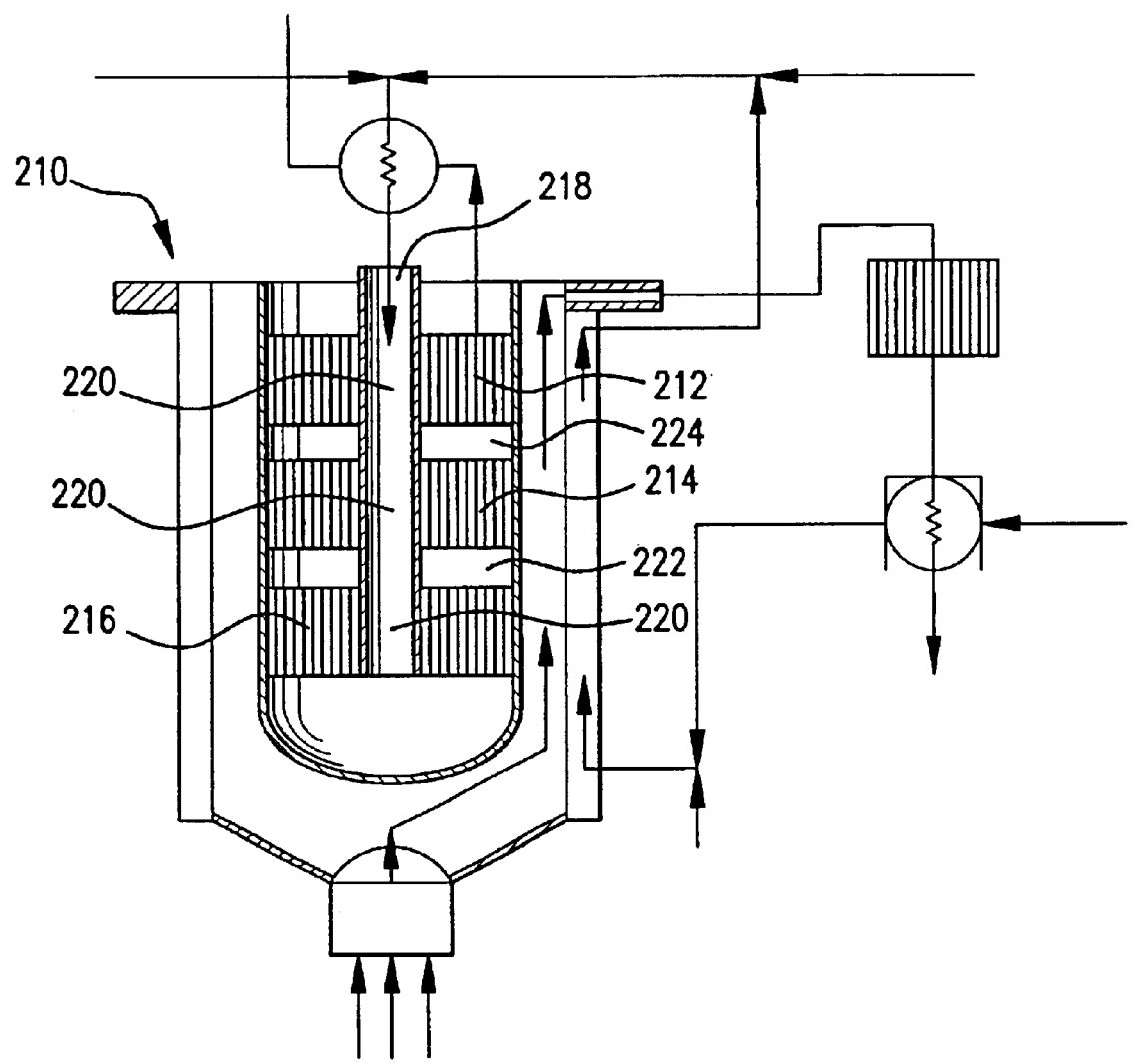
FIG. 11 shows a further embodiment of an integrated reactor assembly of the invention.

Reference is now made to FIG. 11 of the drawings. FIG. 11 is yet another embodiment of the present invention wherein an ATR assembly 210 is configured so as to have three vertically stacked doughnut shaped catalyst layers 212, 214, and 216. A process gas inlet 218 is provided and extends through the center holes 220 of the doughnut shaped layers 212, 214, and 216 and terminates at or shortly after it passes through the center hole 220 of the doughnut shaped catalyst layer 216. There is a space 222 between catalyst layers 216 and 214, and a space 224 between catalyst layers 214 and 212.

In operation, the process gases flow through the inlet 218 in the center of the catalyst layers 212, 214 and 216 and exit below the lowermost catalyst layer 216. The gases reverse flow direction, and then pass substantially vertically upwards through catalyst layers 212, 214 and 216 before exiting from ATR assembly 210. This configuration facilitates improved heat transfer between the process gas and the oxidized WGO waste off-gas. This configuration also permits improved reaction characteristics and increased yield in ATR assembly 210.

Figure 12:
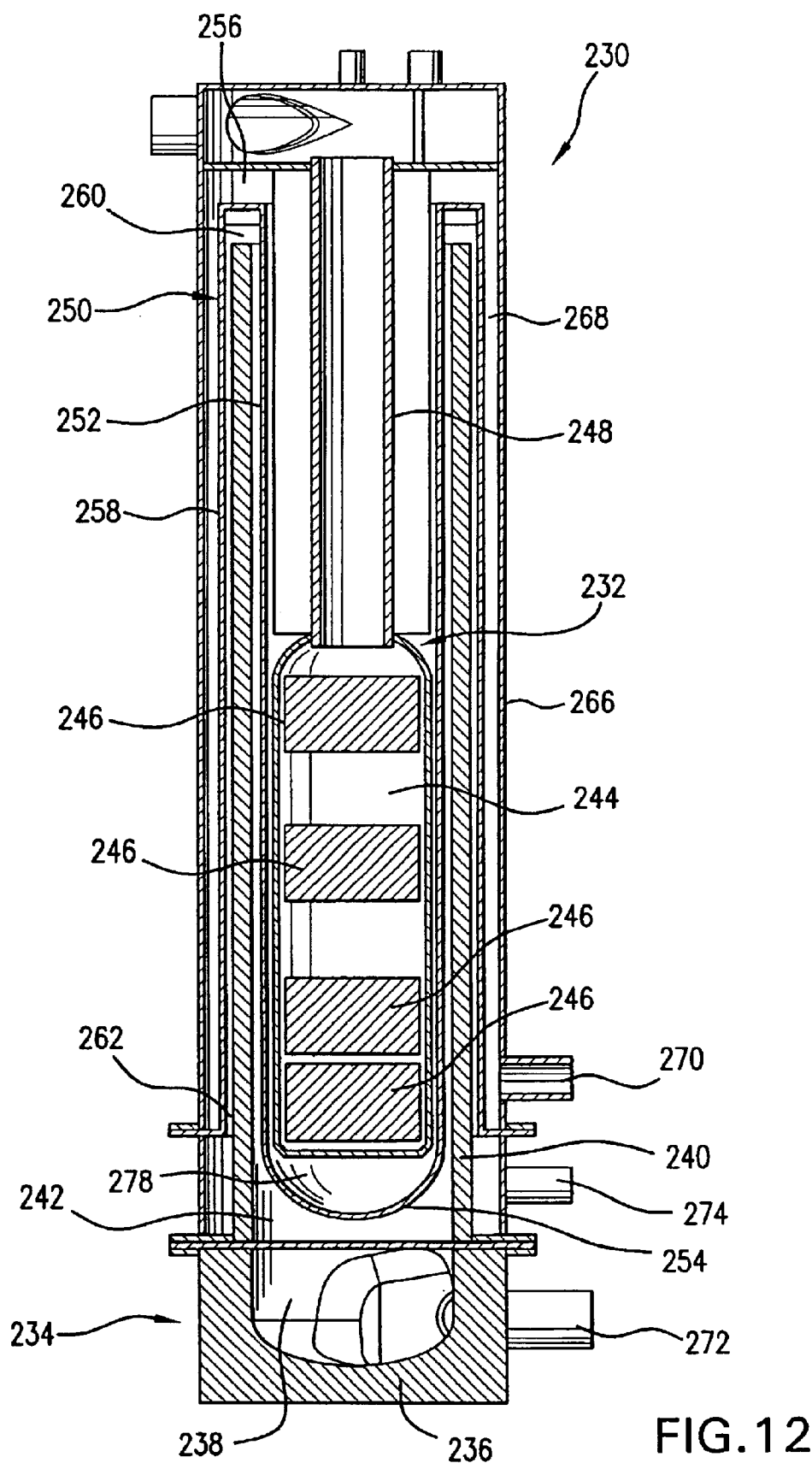
FIG. 12 shows a yet a further embodiment of an integrated reactor assembly of the invention.
Figure 13:
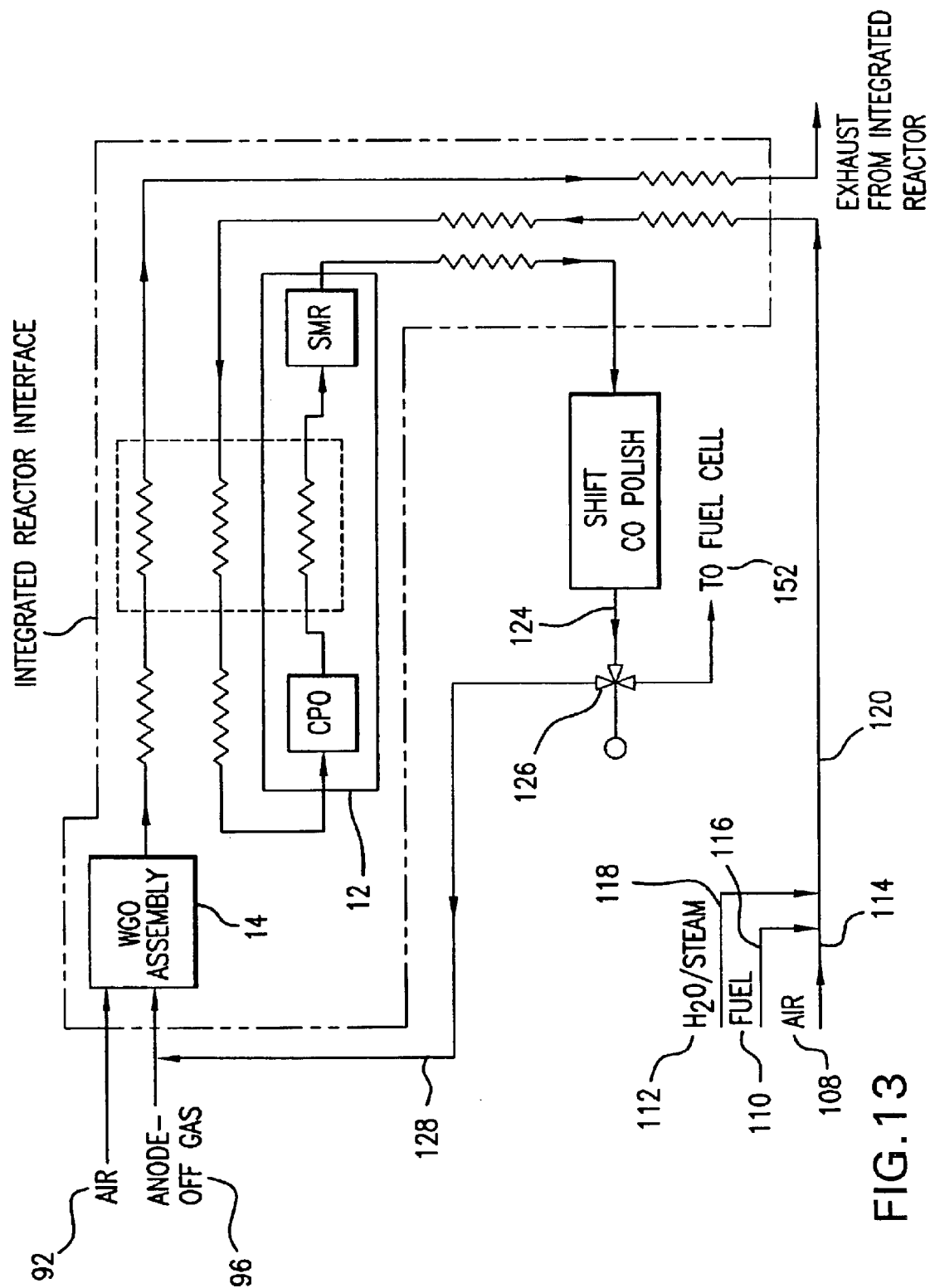
FIG. 13 is a diagram showing schematically the sequential operation of the embodiment of the invention shown in FIG. 12.

Reference is now made to FIGS. 12 and 13 of the drawings showing yet a further embodiment of an integrated reactor 230 of the invention. The integrated reactor 230 comprises an ATR assembly 232 located in/adjacent to an WGO assembly 234. The WGO assembly 234 comprises a housing 236 defining a housing chamber 238 and a tubular insulated housing extension 240 connected to the housing 236 and forming an extension chamber 242. The housing chamber 238 and extension chamber 242 are in communication with each other.

The ATR assembly comprises a catalyst chamber 244 including four catalyst beds 246 stacked substantially vertically, and an outlet heat exchange member 248 downstream of the catalyst beds 246.

The integrated reactor 230 further comprises an intermediate wall structure 250 between the ATR assembly 232 and the WGO assembly 234 for guiding and managing the flow of gases in the integrated reactor 230. The wall structure 250 comprises an inner wall 252 which has a closed lower end 254 and an open upper end 256 and an outer wall 258 which has a closed upper end 260 and an open lower end 262. The housing extension 240 is received within the wall structure 250 and is situated between the inner wall 252 and outer wall 258. The inner wall 252 is located in the extension chamber 242, and forms a container for the ATR assembly 232 which itself is located within the confines of the inner wall 252.

A jacket or envelope 266 surrounds the outer wall 258 and, together with the outer wall 258, defines a flow path 268. A process gas inlet connector 270 is formed in the jacket 266, and process gas is introduced in to the flow path 268 through the connecter.

The WGO assembly 234 has an inlet connector 272 for introducing waste and/or cathode-off gas in to the housing chamber 238. The gases so introduced are combusted within the housing chamber 238 and thereafter pass in to the extension chamber 242, flowing in the space between inner wall 252 of the wall structure 250 and the housing extension 240. At the closed upper end 260 these gases reverse flow direction and flow down in the space between the housing extension 240 and outer wall 258, eventually discharging through outlet port 274. During this flow, thermal energy or heat is transferred to incoming process gases flowing in a path to be described.

The incoming process gases enter the integrated reactor 230 through connector 270 and flow up flow path 268 to the open upper end 256. During this flow, the process gases acquire thermal energy from the hot gases produced by the WGO assembly and flowing in the space between outer wall 258 and the housing extension 240. At the open upper end 256, flow direction of the process gases is reversed and the gases flow downwardly between inner wall 252 and the outlet 248, and thereafter between the inner wall 252 and the wall of the catalyst chamber 244. During this flow, the incoming process gases acquire further thermal input from the hot gases produced by the WGO assembly, which are flowing through the space between the housing extension 240 and the inner wall 252. Eventually, the incoming gases enter the space 278 defined by the closed lower end 254 of the wall structure 250, after which they pass through the catalyst beds 246, and undergo reaction as preciously described.

The embodiment of FIG. 12 shows an extended and substantial exposure of the incoming gases to the exothermic products of reaction in the WGO assembly, providing an effective and increased preheating of these incoming gases.

Figure 15:
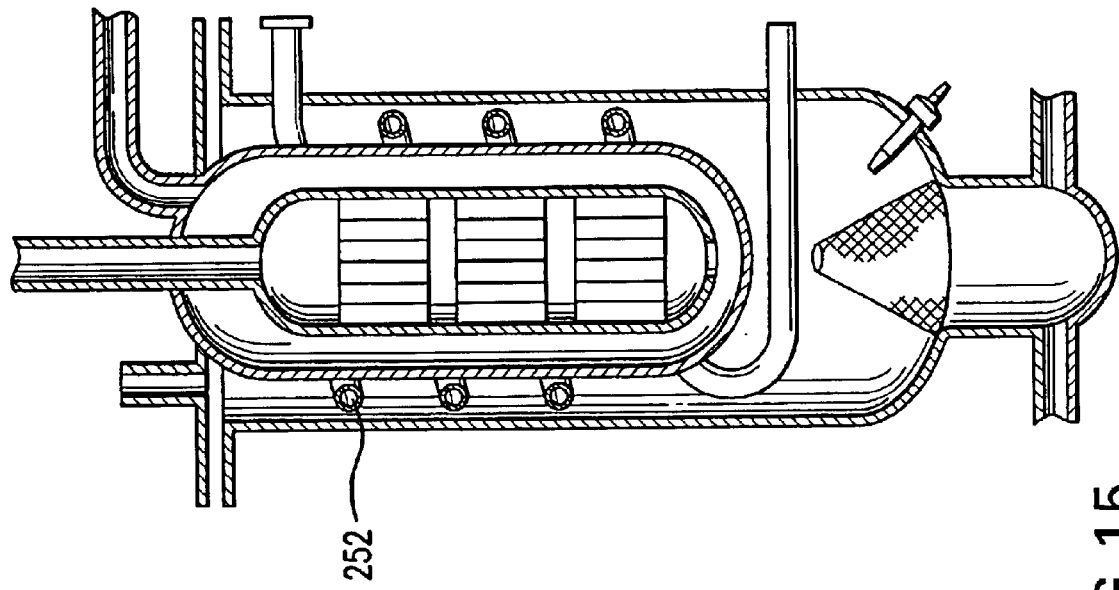
FIG. 15 shows a schematic cross-section through an embodiment of the invention including an internal heat transfer coil configuration.
Figure 14:
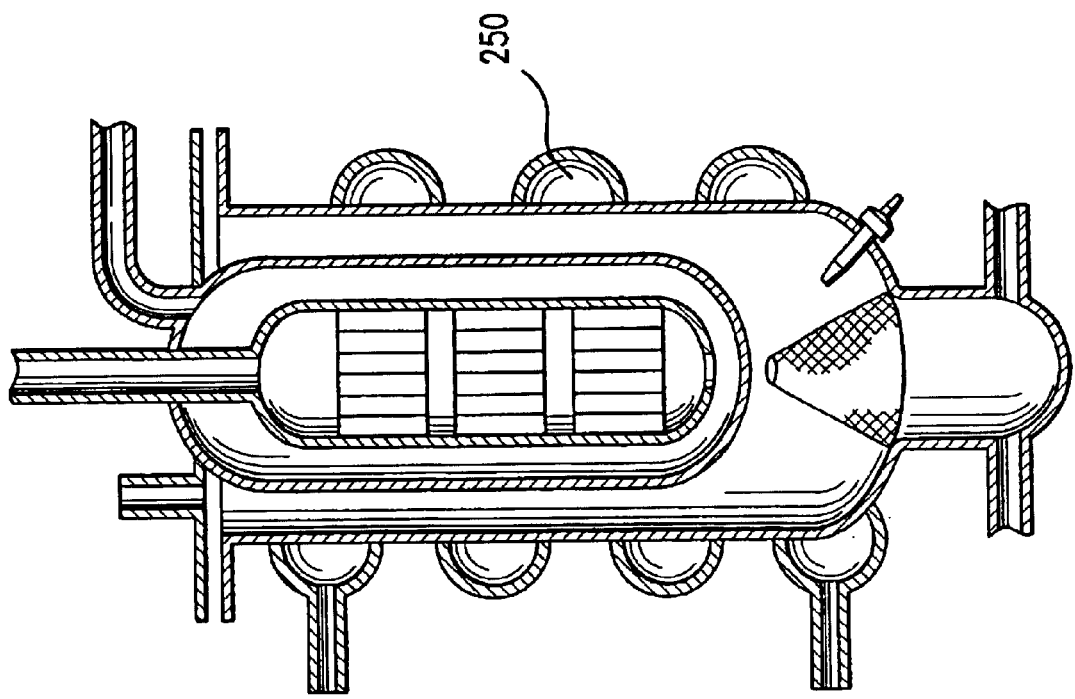
FIG. 14 shows a schematic cross-section through an embodiment of the invention including a limpet-type coil configuration.

It will be apparent that other heat transfer configurations may be used for heating the water in the space 56 shown in FIG. 1 of the drawings. For example, a limpet coil configuration 250, as shown in FIG. 14 of the drawings, may be used instead of the jacket configuration to effect the heat transfer between the WGO waste off-gas and the water. In another configuration, a helical or internal heat transfer coil 252, as shown in FIG. 15 of the drawings, containing the water may be provided in the annular space or chamber 62 formed between the heat exchange wall 54 of the WGO assembly 14 and the heat exchange wall 16 of ATR assembly 12. These alternate configurations will be equally effective in heating water to provide steam for the system.

It will be apparent from the foregoing description that the integrated reactor of the present invention allows for operation of the ATR assembly 12 with lower amounts of oxidant or air, thus enabling it to achieve higher efficiencies. Furthermore, the integrated reactor of the present invention also facilitates transfer of a higher quality heat from the WGO assembly 14 into the process gases of the ATR assembly 12.

Yet another advantage of the present invention is that the integrated reactor can be constructed so as to be lighter in mass and smaller in volume and hence lower in cost than comparable reformers.

These and other advantages will become apparent to one of ordinary skill in the art. It should be noted that the above examples and embodiments of the present invention described above are only meant to be representative in nature. Yet other embodiments and variations of the present invention will be apparent to one of ordinary skill in the art and are construed as falling within the scope of the invention which should be evaluated in light of the following claims.

What is claimed is:

1. An integrated reactor for producing fuel gas for a fuel cell, the integrated reactor comprising:
    an waste gas oxidizer (WGO) assembly having an associated WGO chamber, an inlet, an outlet and a flow path for exothermic gases produced in the WGO chamber; and
    an autothermal reactor (ATR) assembly located at least partially in the WGO chamber, the ATR assembly having an inlet means and an outlet means for process gases flowing therethrough and a catalyst bed intermediate the inlet and outlet means, at least part of the inlet means of the ATR assembly being located in the flow path of the WGO chamber.

2. An integrated reactor as claimed in claim 1 wherein the WGO assembly further comprises a water flow path, the water flow path being in or adjacent the WGO chamber so that hot gases produced in the WGO chamber provide thermal energy to water flowing through the water flow path.

3. An integrated reactor as claimed in claim 2 wherein the WGO assembly comprises an inner wall and an outer wall, the inner and outer walls defining an annular space, wherein the annular space constitutes the water flow path.

4. An integrated reactor as claimed in claim 3 wherein the annular space between the inner and outer walls of the WGO assembly has a water inlet near a lower end thereof and a water/steam outlet near an upper end thereof.

5. An integrated reactor as claimed in claim 2 wherein the water flow path comprises a limpet coil about the WGO chamber.

6. An integrated reactor as claimed in claim 2 wherein the water flow path is comprised of an internal heat transfer coil located within the WGO chamber.

7. An integrated reactor as claimed in claim 1 wherein the inlet of the WGO assembly comprises a first connector pipe for the introduction of anode off-gas from a fuel cell, and a second connector pipe for introduction of cathode off-gas from a fuel cell.

8. An integrated reactor as claimed in claim 7 wherein the WGO assembly further comprises a mix chamber for mixing the anode off-gas and the cathode off-gas, and ignition means for initiating combustion within the WGO assembly.

9. An integrated reactor as claimed in claim 8 wherein the ignition means is selected from at least one of: a spark plug, a glow plug and an ignition source.

10. An integrated reactor as claimed in claim 8 wherein the WGO assembly further comprises a surface radiator associated with a combustion flame holder for radiating heat within the WGO chamber.

11. An integrated reactor as claimed in claim 1 wherein the ATR assembly is substantially wholly located within the WGO chamber.

12. An integrated reactor as claimed in claim 1 wherein the ATR assembly comprises an inner chamber containing the catalyst bed, and an outer wall, the inner chamber and outer wall defining an annular space through which process gases flow toward the catalyst bed, the annular space receiving thermal energy from the hot gases produced in the WGO chamber.

13. An integrated reactor as claimed in claim 1 wherein the ATR assembly catalyst bed comprises a partial oxidation catalyst, and two sequentially arranged steam methane reformer catalysts downstream of the partial oxidation catalyst.

14. An integrated reactor as claimed in claim 1 wherein the ATR assembly has separate inlet means for air, fuel and water.

15. An integrated reactor as claimed in claim 14 wherein the inlet means for the water comprises heat exchange means whereby thermal energy for water within the water inlet means is received from the WGO chamber.

16. An integrated reactor as claimed in claim 14 wherein the separate inlet means for air, fuel and water are converged into a combined single inlet means, the single inlet means having heat exchange means whereby thermal energy from the WGO chamber is received within the single inlet means.

17. An integrated reactor as claimed in claim 1 further comprising a shift reactor and carbon monoxide polishing assembly downstream of the ATR assembly.

18. An integrated reactor as claimed in claim 17 further comprising a valve means downstream of the shift reactor and CO polishing assembly for selectively directing reacted gases back to the WGO assembly or to the fuel cell.

19. An integrated reactor as claimed in claim 1 further comprising a valve means downstream of the ATR assembly for selectively directing reacted gases back to the WGO assembly or to the fuel cell.

20. An integrated reactor as claimed in claim 1 wherein the inlet means of the ATR assembly comprises a separate fuel inlet means, the separate fuel inlet means including heat exchange means so that thermal energy from the WGO assembly preheats fuel in the separate fuel inlet means.

21. An integrated reactor as claimed in claim 1 wherein the inlet means of the ATR assembly comprises a separate air inlet means, the separate air inlet means including a heat exchanger for receiving thermal energy reacted process gases exiting the ATR assembly.

22. An integrated reactor as claimed in claim 1 further comprising conductive thermal transfer members to facilitate spread of thermal energy within the ATR assembly.

23. An integrated reactor as claimed in claim 22 wherein the conductive thermal transfer member comprises a heat pipe extending vertically through the catalyst bed.

24. An integrated reactor as claimed in claim 22 wherein the conductive thermal transfer member comprises a plurality of heat pipes transverse to an axis of process gas flow, and extend through a wall of the ATR assembly.

25. An integrated reactor as claimed in claim 22 wherein the conductive thermal transfer member comprises a series of wedge-shape conductors in the catalyst bed.

26. An integrated reactor as claimed in claim 1 wherein the catalyst bed comprises a partial oxidation catalyst and a plurality of steam methane reforming catalysts, arranged in a substantially vertical stack, and deflector means within and adjacent the catalyst bed for moving the process gases in a spiral flow path to enhance heat exchange with the WGO gases.

27. A method of providing thermal energy to process gases in an autothermal reactor (ATR) assembly, the method comprising:
    positioning an ATR assembly at least partially within a chamber of an waste gas oxidizer (WGO) assembly, the ATR assembly having an inlet means and an outlet means for process gases flowing therethrough;
    combusting waste gas within the WGO chamber to produce heat; and locating the inlet means of the ATR assembly within the chamber of the WGO assembly to facilitate heat transfer therebetween.

28. A method as claimed in claim 27 wherein the ATR assembly is positioned wholly within the chamber of the WGO assembly.

29. A method as claimed in claim 27, further comprising introducing the process gases separately as water, fuel and/or air, and preheating either or all of the air, fuel and water separately prior to mixing thereof.

30. A method of controlling an integrated reactor having an autothermal reactor portion and a waste gas oxidizer portion, the method comprising:

independently controlling the air or oxidant to the ATR portion with regards to the fuel flow to the ATR;

independently controlling the water/steam to the ATR portion with regards to the fuel flow to the ATR;

increasing the air or oxidant flow rate to enhance the rapid transient characteristics of the ATR process or decreasing the air or oxidant flow rate to enhance the higher efficiency characteristics of the SMR process.

31. A method as claimed in claim 30 further comprising:

independently controlling the air or oxidant to the WGO portion with regards to the heating value of the waste gas stream;

decreasing the air or oxidant flow to the WGO combustor enhancing the preheat temperature of the process gases entering the ATR or increasing the air flow to the WGO to enhance the heat transfer to the ATR while decreasing the preheat temperature of the process gases.

* * * * *